(12) United States Patent
VanDeBurg et al.

(10) Patent No.: US 10,824,645 B1
(45) Date of Patent: *Nov. 3, 2020

(54) SYSTEM AND METHOD FOR SYNCHRONIZING INCIDENT RESPONSE PROFILES ACROSS DISTINCT COMPUTING PLATFORMS

(71) Applicant: Servpro Industries, Inc., Gallatin, TN (US)

(72) Inventors: Scott VanDeBurg, Gallatin, TN (US); Rick Isaacson, Gallatin, TN (US); Chad Lewis, Gallatin, TN (US); Paul Brienza, Gallatin, TN (US); James Geurts, Milwaukee, WI (US); James Lyman, Milwaukee, WI (US)

(73) Assignee: Servpro Industries, Inc., Gallatin, TN (US)

( * ) Notice: Subject to any disclaimer, the term of this patent is extended or adjusted under 35 U.S.C. 154(b) by 487 days.

This patent is subject to a terminal disclaimer.

(21) Appl. No.: 15/893,755

(22) Filed: Feb. 12, 2018

Related U.S. Application Data

(63) Continuation of application No. 14/457,698, filed on Aug. 12, 2014, now Pat. No. 9,892,184.
(Continued)

(51) Int. Cl.
*G06F 16/00* (2019.01)
*G06F 16/27* (2019.01)
(Continued)

(52) U.S. Cl.
CPC ........ *G06F 16/275* (2019.01); *G06F 21/6218* (2013.01); *G06Q 50/265* (2013.01)

(58) Field of Classification Search
CPC .. G06F 16/275; G06F 21/6218; G06Q 50/265
See application file for complete search history.

(56) References Cited

U.S. PATENT DOCUMENTS 6,343,299 B1  1/2002  Huang et al.
7,280,522 B2  10/2007  Izumida
(Continued)

FOREIGN PATENT DOCUMENTS

WO  WO-2004049198 A1 *  6/2004  ............. G06F 16/29

*Primary Examiner* — Taelor Kim
*Assistant Examiner* — Lahcen Ennaji
(74) *Attorney, Agent, or Firm* — Patterson Intellectual Property Law, P.C.; Edward D. Lanquist, Jr.; Gary L. Montle (57) ABSTRACT

A synchronized incident response system is distributed across one or more user devices and a host server. Each device has a stored version of an incident response profile for a defined location, the profile having version numbers corresponding to a set of data values for one or more attributes specific to the defined area. Each device is linked to the server and can transmit data records with changes to profile attributes, wherein the server determines whether the user changes are valid updates with respect to what is already stored in server memory. If so, the server synchronizes the profile attributes to generate a current profile and generates incremented version numbers. Each device can provide an incident response request for the defined area to the server, wherein the server generates an incident response report populated with data corresponding to a latest version number for each of one or more predetermined attributes.

15 Claims, 5 Drawing Sheets

Related U.S. Application Data

(60) Provisional application No. 61/871,728, filed on Aug. 29, 2013.

(51) Int. Cl.
*G06Q 50/26* (2012.01)
*G06F 21/62* (2013.01)

(56) References Cited

U.S. PATENT DOCUMENTS

| | | |
|---|---|---|
| 7,526,768 B2 | 4/2009 | Schleifer et al. |
| 7,644,125 B2 | 1/2010 | Baynes, Jr. et al. |
| 7,983,249 B2 | 7/2011 | Galluzzo et al. |
| 8,315,976 B2 | 11/2012 | Multer et al. |
| 8,336,022 B2 | 12/2012 | Turner et al. |
| 8,402,060 B2 | 3/2013 | Elad et al. |
| 8,503,984 B2 | 8/2013 | Winbush, III |
| 9,342,976 B2 | 5/2016 | Pfeffer |
| 2001/0056435 A1* | 12/2001 | Quick ................... G06Q 40/08 |
| 2007/0180075 A1* | 8/2007 | Chasman ................ G06F 16/27 709/223 |
| 2008/0281638 A1 | 11/2008 | Weatherly et al. |
| 2011/0071880 A1* | 3/2011 | Spector ................... H04W 4/90 340/573.1 |
| 2011/0087510 A1* | 4/2011 | Putra ................ G06Q 10/06311 705/7.13 |
| 2013/0173541 A1 | 7/2013 | Iyer et al. |
| 2014/0365390 A1 | 12/2014 | Braun |

\* cited by examiner

SYSTEM AND METHOD FOR SYNCHRONIZING INCIDENT RESPONSE PROFILES ACROSS DISTINCT COMPUTING PLATFORMS

CROSS-REFERENCES TO RELATED APPLICATIONS

This application is a continuation of U.S. patent application Ser. No. 14/457,698, filed Aug. 12, 2014, and further claims benefit of U.S. Provisional Patent Application No. 61/871,728 filed Aug. 29, 2013, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to server-based incident response profiles. More particularly, the present invention relates to a system enabling users to synchronize incident response profiles for a defined area such as a commercial building across a plurality of distinct computing platforms.

As many as fifty percent of all businesses close down following a disaster, such as for example a flood or fire. Of the businesses that survive, an overwhelming majority of them had an immediate plan of action in place, such that timely and informed response and damage mitigation could take place.

However, current systems in place only provide central repositories for an incident response profile generated by a specific user, usually a technician for a third party responder. Updates to a profile have traditionally required gathering information remotely from the site at issue, such as photos, location, dimensions, priority areas such as fire escapes, valves, etc., and then later entering the information via a hosted website or manually filing the information. This system discourages active participation by users in keeping the profile up to date and further fails to enable real-time updates or alerts, such as for example in the event of an incident.

It would be desirable, therefore, to provide a system for generating, editing and viewing an incident response profile for a defined area such as a commercial building that could be accessed at any time, using any number of computing platforms such as may be implemented onsite with mobile devices.

It would further be desirable to provide a system capable of synchronizing profile data from a variety of sources and computing platforms, and properly identifying the most recent and valid updates to profile data, in order to facilitate an appropriate response in the event of an incident.

BRIEF SUMMARY

Briefly stated, systems and methods of an invention as disclosed herein may enable synchronization of incident response profile data with respect to a defined area and across distinct computing platforms. The incident response profile includes critical information for a defined area such as a commercial facility so as to speed up response times after incident events causing, e.g., fire or water damage. A novel server configuration and distributed program instructions allow users the ability to enter relevant data from, e.g., a desktop computer, tablet or smartphone, and further supports multiple operating systems (e.g., iOS, Android, Blackberry). The information entered is automatically synchronized among multiple platforms and users can access data by simply logging into the application or web-based program version to ensure a seamless user experience across all devices. Via the synchronized profile, the program tracks property details, utility shut off locations, key contacts, damage photos, local weather, etc.

In one embodiment of an invention as disclosed herein, a synchronized incident response system is distributed across one or more user devices and a host server. Each device has a stored version of an incident response profile for a defined location, the profile having version numbers corresponding to a set of data values for one or more attributes specific to the defined area. Each device is linked to the server and can transmit data records with changes to profile attributes, wherein the server determines whether the user changes are valid updates with respect to what is already stored in server memory. If so, the server synchronizes the profile attributes to generate a current profile and generates incremented version numbers. Each device can provide an incident response request for the defined area to the server, wherein the server generates an incident response report populated with data corresponding to a latest version number for each of one or more predetermined attributes.

In one aspect, one of the profile-specific attributes may be a list of one or more incident responders and associated contact information, wherein the server generates a user interface comprising the incident response report on a user device associated with a first incident responder selected from the list of one or more incident responders associated with the defined area.

In other aspects, the first incident responder may be selected from the list based entirely on a user-specified hierarchy, or at least in part on one or more additional criteria such as geographical proximity, responder-specified call settings, etc.

In another aspect, the incident response request may include a type of incident, wherein the incident response report further includes response information derived from profile-specific attributes in association with the type of incident.

In still other aspects, the response information may be further derived from attributes stored in the hosted database for related areas with respect to the defined area, or from third party data sources associated with the defined area, the third party data comprising one or more of priority areas within the defined area, incident contacts associated with the defined area, and priority elements relevant to the type of incident.

DETAILED DESCRIPTION

Referring generally to FIGS. 1-5, various embodiments of a system and method for synchronizing incident response profiles across a number of distributed computing platforms may now be described. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Figure 1:
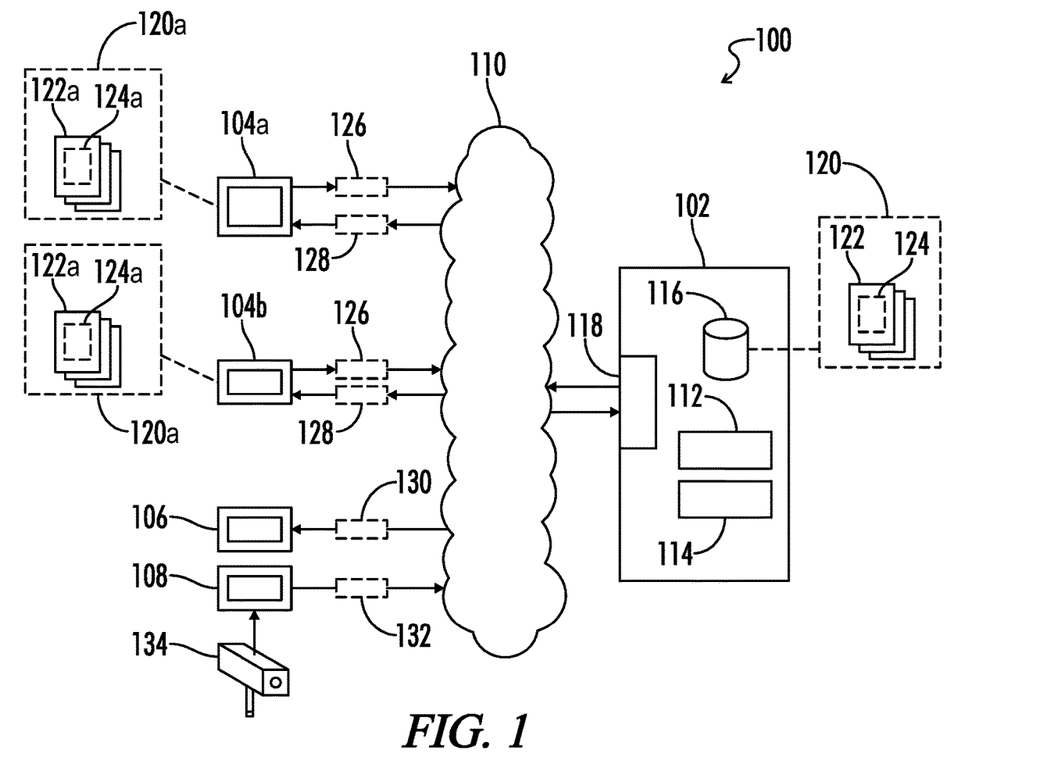
FIG. 1 is a block diagram representing an exemplary embodiment of a system in accordance with the present disclosure.

Referring first to FIG. 1, in one embodiment a system 100 may include a server 102 functionally linked via a communications network 110 to remote computing devices associated with client users 104 and incident responders 106. With respect to a particular defined area, the client users may include a primary user 104a, such as for example a user that initiates or otherwise creates a first version of an incident response profile for the area, and one or more secondary users 104b that are designated by the primary user for "sharing" the profile and are further enabled to view, revise, etc., one or more attributes associated therewith. The server 102 may include one or more processing units 112, computer-readable media storage and/or memory 114 including executable program modules for performing hosted operations as described herein, local memory 116 upon which is stored the incident response profile 120, and an interface module 118. Various such components such as the memory 116 may be resident upon a single server or may be distributed in nature but functionally linked wherein programmed operations may be executed in equivalent fashion. The interface module 118 may generally be effective to generate, implement or otherwise interact with one or more user interfaces by which the server is linked to the one or more devices via network 110, and the module 118 may include or otherwise facilitate communications via any buses, firewalls, API's, DMZ's or the like.

The term "user interface" as used herein may unless otherwise stated include any input-output module with respect to the hosted server including but not limited to web portals, such as individual web pages or those collectively defining a hosted website, mobile desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present invention.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

An incident response profile 120 as stored on the host server 110 or for example in any associated data repository may typically include a set of business objects 122 associated with the defined area, each of the business objects further having a set of associated attributes 124 for which area-specific values may be entered to thereby uniquely define the profile 120. For the purposes of this disclosure and ease of illustration, a single profile 120 will be referred to with respect to an associated defined area. However, it may be understood that any number of distinct profiles may be created and stored in association with the host server within the scope of an invention as described herein, and a plurality of profiles 120 associated with a plurality of defined areas may use a common universe of business objects, wherein the attributes and values associated with a first set of business objects are the distinguishing factor with respect to a second set of business objects. In various embodiments a unique universe of objects may be provided with respect to the type of defined area, such as for example an apartment building as opposed to a commercial building, farmland, mobile property, etc.

Business objects, as referred to in the context of an incident response profile of the present disclosure, may be individually defined with respect to one or more particular attributes, and further may be defined as related to or dependent upon a state of one or more additional business objects. Business objects may include one or more links, parameters, instructions, rules, metadata or the like as may be used to provide functions as defined herein, and may further individually be associated with particular rules, algorithms or the like to confirm the validity of associated attribute values, etc. Exemplary business objects within the context of an incident response profile may include without limitation: property details; contact information; utility details; weather information; client user information, etc. Exemplary attributes for a particular business object, such as "Property", may include without limitation: address; city; directions; name; name of owner; type of property; zip code, etc. Image files (photos) may be "values" for attributes associated with a particular business object, as may textual input (e.g., address) or numerical variables (e.g., temperature). Accordingly, one of skill in the art may understand that in various embodiments a particular business object may be defined or formatted in any number of structural manners to accommodate the associated attributes and the expected values.

For each primary (local) version of the incident response profile 120 stored on the host server 110, at least one secondary (remote) version of the profile 120a may further be stored in memory on the computing devices of any one or more users that are authorized with respect to the particular profile. While the primary 120 and secondary 120a versions of the profile may differ with respect to for example the values stored in the respective devices for a given one or more attributes, the objects themselves may generally be mirror images of each other regardless of the computing platform, field of use, database schema, etc.

While as noted above the server 102 may be communicatively linked to receive and transmit data records with respect to user devices 104 and incident responder devices 106, and generate or otherwise implement user interfaces generated on a display unit associated with such devices 104, 106, the server 102 may further in some embodiments be linked to data transmission units 108 having associated sensors 134 such as for example cameras physically mounted in associated with the defined area, global positioning systems, third party databases such as for example weather services, and the like. Such units 108 may be effective to collect photos or other relevant data and dynamically transmit data packages 132 to the server for entry as updated attributes into dedicated database fields or the like, without otherwise requiring confirmation or validation from users. Alternatively, the units may periodically and passively collect image files or other data and store the data in a local memory, for example in a first-in-first-out structure, wherein the most recent version of the data may be retrieved by the server upon a trigger such as for example an incident response request or a wide-scale synchronization request for the profile.

Figure 2:
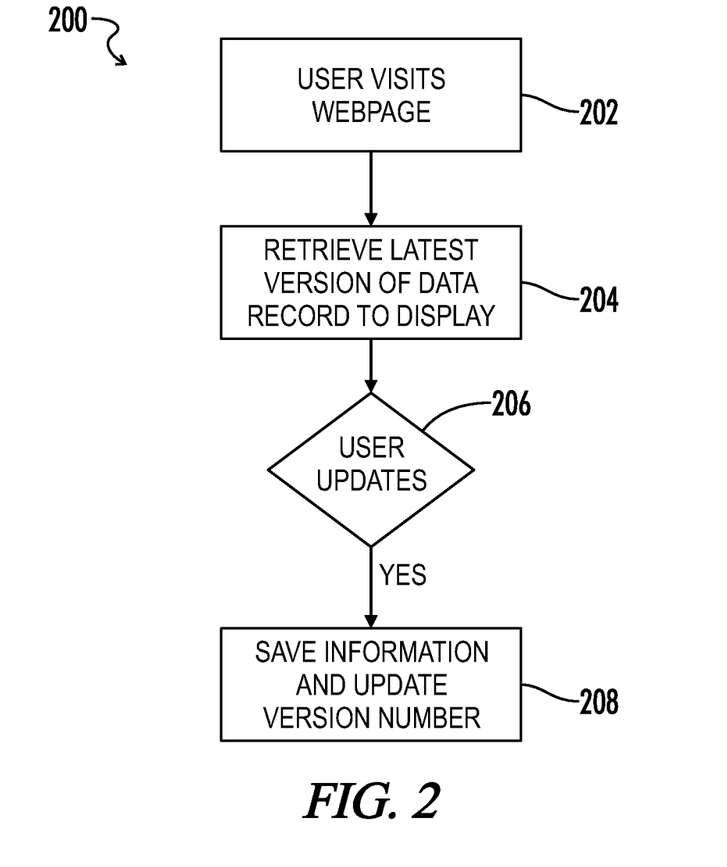
FIG. 2 is a flowchart representing an exemplary process flow with respect to a web interface of a system in accordance with the present disclosure.
Figure 3:
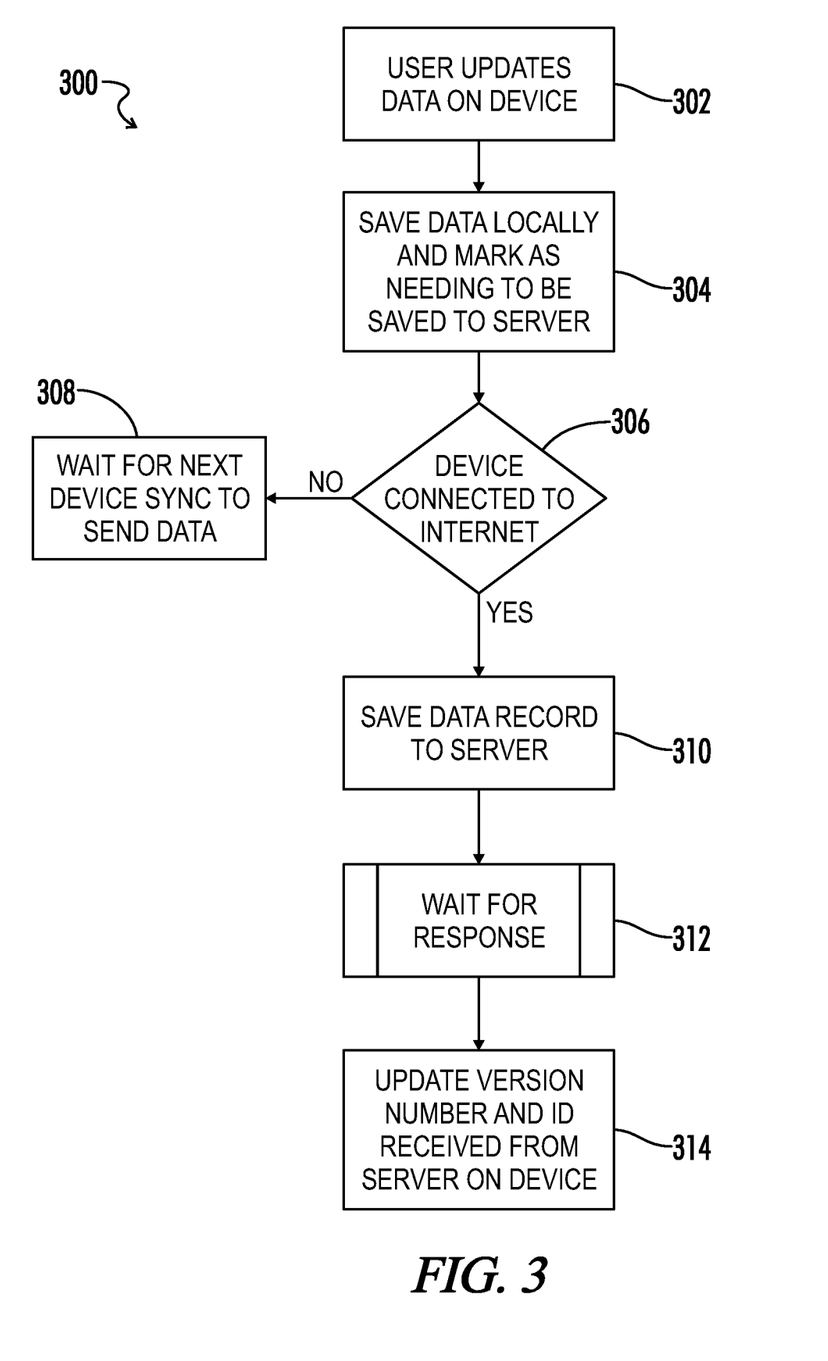
FIG. 3 is a flowchart representing an exemplary process flow with respect to a mobile application of a system in accordance with the present disclosure.
Figure 4:
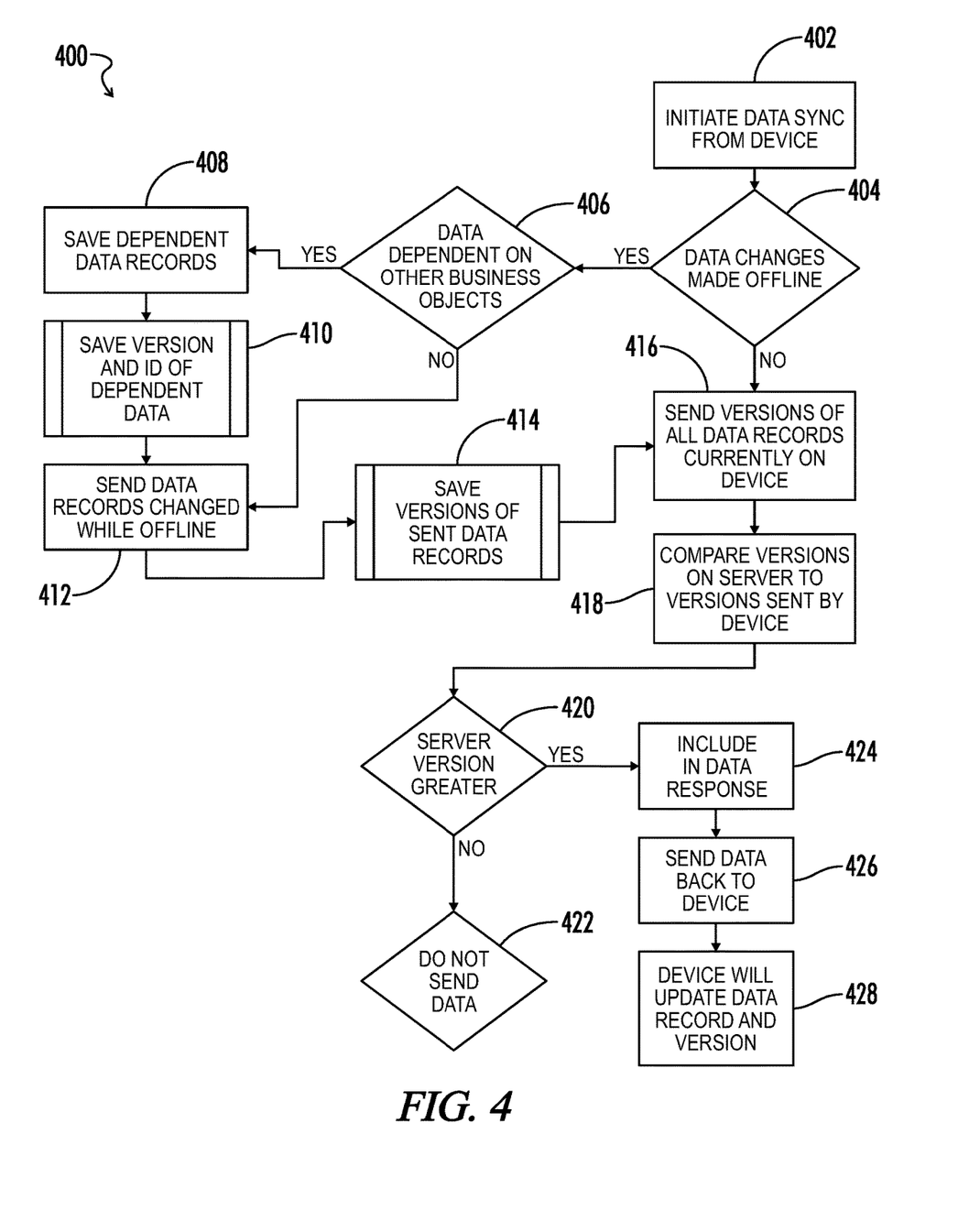
FIG. 4 is a flowchart representing an exemplary process flow with respect to a host server of a system in accordance with the present disclosure.

Briefly stated, in various embodiments the system 100 may generally facilitate the creation of an incident response profile 120 for a defined area, and synchronize subsequent revisions to the profile data across a number of user platforms. Referring to FIGS. 2-4, various examples of user access and profile synchronization may next be discussed.

In one example of a web-implemented process 200, a user visits a hosted web page (202) and via an associated user interface tool is able to request access to a particular profile. The server may respond by calling and retrieving a latest version of a data record for the profile, and displaying the data record to the user (204). The aforementioned steps may equally refer to a request to create a new profile, wherein the latest version may be nothing more than a template with one or more blank data entry fields for user specification, or a request to retrieve a latest version of an existing profile. Upon the user closing the webpage, navigating from the webpage, or otherwise after a predetermined period of time, the server may determine whether or not the user has provided one or more updates to values for attributes in the data record (206). If not, the server may simply do nothing, but otherwise the server saves the data record and associated information, and updates a version number for the profile (208).

In one embodiment, the server may generate one version number for a particular version of the profile. Alternatively, the server may track version numbers for respective business objects associated with the profile, or for individual attributes associated with one or more business objects.

In one embodiment, the server may enable a first user as a primary user to designate one or more secondary users that may or may not be authorized to revise any and all attribute values. For example, the server may implement a validation hierarchy, wherein all updates from the primary user are automatically saved into the server but wherein updates from one or more secondary users are submitted to the primary user for validation prior to entry into the server-maintained profile. Further, the primary user may be enabled by the system to for example designate secondary users that may provide updates without requiring validation and tertiary users for which updates do require validation, but wherein otherwise the secondary and tertiary users have substantially identical access to the profile information.

In one example of a process 300 executed via a mobile application or otherwise a resident program product, Java applet, code snippet or the like as may be executable without server access at a given point in time, the user may access a resident version of the profile on a respective computing device (302). The user may review and subsequently revise values for one or more attributes of objects in the associated profile, using for example data entry fields, popup boxes, uploads of image files, or the like, wherein the revised data may be stored in local memory of the user device (304). If the local application is being executed without the device being connected to the internet or equivalent communications network, the application tags the profile and/or relevant objects and attributes as a data record needing to be saved to the server and waits in dormant fashion for the next device synchronization request in order to send the data record (306, 308). If the device is connected to the server via the communications network, the application may initiate or otherwise facilitate a data transfer to the server (306, 310). The device application remains active to await a response from the server (312), and subsequently receives and locally stores an updated version number and identification from the server.

In one example of a process 400 executed by program modules resident on the host server, a first step includes receiving a request to initiate data synchronization from a remote user device via the network (402). The data synchronization request may typically be standard for any login procedure wherein the user device is remotely linked to the server, but otherwise may in certain embodiments be a separately implemented feature. In one embodiment, a data record associated with the user device may include a flag or other identifying means to inform the server whether data changes have or have not been made offline (404). Otherwise, the server may access the user device using resident tools such as for example cookies to review a current data record associated with the user device and determine if there have been data revisions made offline.

If changes have been made offline, the server may first determine whether the revised data or attributes for which the revisions have been made are dependent upon or otherwise associated with other business objects in the profile (406). For example, a user modification of values associated with an attribute for a first object (e.g., "Property") may have a direct or indirect effect on attribute values for dependent or otherwise related objects (e.g., "Contact" or "Utility"). If so, the server saves dependent data records (408) and saves an updated version number and identifier for the dependent data (410). Either way, the method continues by sending one or more data records including any values for attributes that have been changed offline (412), wherein the server saves the received data records (414), assuming that the data records do not require review and validation by a primary user.

If changes have not been made offline, or otherwise after the offline changes have been processed and saved, the server retrieves version numbers for all data records (e.g., attribute values) currently stored on the device (416), and compares the version numbers for like attributes in the server-maintained profile to the retrieved version numbers (418). If the version numbers match, the synchronization process may be considered complete and no data records are transmitted back to the device (420, 422). If one or more version numbers for respective attributes or objects in the server-maintained profile are greater than their counterparts in memory on the user device, the server may generate a data response file including at least the attributes and/or objects for which a disparity in version numbers has been determined (420, 424). The data response file is then transmitted via the communications network to the user device (426) at which time the device-executed application may update the local profile and associated version numbers (428).

Figure 5:
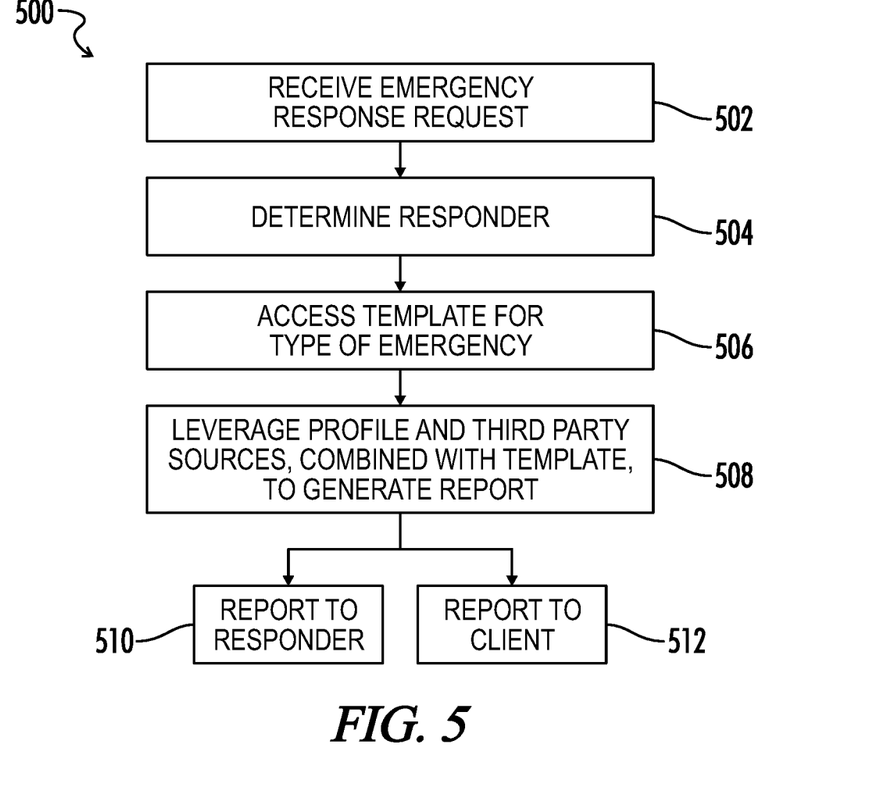
FIG. 5 is a flowchart representing an exemplary incident response request process flow in accordance with the present disclosure.

Referring now to FIG. 5, in various embodiments the server may execute an incident response reporting method 500 upon, for example, receiving an incident response request (502). The request may in certain embodiments be required to have been provided from a primary user, or one of a group of authorized requesters including the primary user. In one embodiment, a user simply accesses a webpage or other hosted interface associated with incident response requests, and selects predefined icons or other tools to initiate a standard response for a particular type of incident, such as for example a fire, flood, etc. In one alternative or supplemental embodiment, the user may generate a customized response request by populating an incident response request template with photos or other details relevant to the incident and an associated incident response. Typically, the incident response profile will include much of the general information needed to auto-fill a request in association with a type of incident, but the method may enable review and editing of various attribute values in conjunction with the request and based on the actual incident.

The method proceeds by determining an incident responder in association with the response request (504). In some embodiments, the profile will itself include a specific incident responder, which may be an individual or a business entity, wherein the system may retrieve the contact name and associated contact information. In other embodiments, the system may have enabled the user to provide a hierarchy of incident responders, based on for example the type of incident, proximity to the defined area upon receiving the request, etc. The system may further enable incident responders to provide updated parameters to the system regarding for example availability and proximity, wherein the system may algorithmically determine an optimal incident responder for a particular incident request.

The method may extract a report template associated with the particular type of incident (506), and subsequently generate a report for distribution to the responder by populating the template with required information by leveraging the incident response profile and any available and relevant third party data sources (508) for relevant location data. For example, the profile may identify locations for fire escapes, hazards, shutoff valves, and the like, but may lack real-time information that may be optimally collected from third party data sources. The system may further or alternatively extract or otherwise obtain location data with respect to analogous locations. As one example, where detailed information is lacking for a first defined area regarding local codes, priority areas or mandatory contact information, the system may retrieve such information from profiles for analogous areas where for example an equivalent incident has been recorded in the past. The system may enable feedback from responders regarding best practices in future responses for a particular type of defined area, and tag all analogous defined areas for future monitoring or otherwise provide values for respective attributes within profiles for analogous defined areas wherein such feedback may be leveraged in producing a response report.

The system may transmit or otherwise generate a displayable version of a first version of an incident response report to a responder (510), and may further provide a copy of the same report or a separate and further customized version of an incident response report to the client user (512). For example, the user may be provided with user-specific information for responding to the incident that would otherwise be irrelevant for the incident responder, such as insurance contact information.

The previous detailed description has been provided for the purposes of illustration and description. Thus, although there have been described particular embodiments of a present invention, it is not intended that such references be construed as limitations upon the scope of this invention except as set forth in the following claims.

What is claimed is:

1. A system for supporting incident response with respect to a defined area such as a commercial building, the defined area having one or more incident response attributes including locations for priority areas, the system comprising:
   a plurality of user computing devices each comprising a memory in which is stored a respective version of an incident response profile associated with a defined area, each respective version of the incident response profile having a version number and uniquely comprising a set of data values for one or more of the incident response attributes specific to the defined area;
   a server comprising a memory in which is stored another respective version of the incident response profile associated with the defined area, the server configured to perform operations of:
      receiving from an authorized one of the plurality of user devices an incident response request associated with the defined area and comprising a type of incident;
      receiving from each of the plurality of user devices data records corresponding to the respective version of the incident response profile;
      determining whether one or more data values comprise valid updates with respect to data values stored in the server memory for the one or more attributes;
      synchronizing any determined valid updates with each other data value to generate a current incident response profile in the server memory, and generating one or more incremented version numbers corresponding to the current incident response profile; and
      generating a user interface comprising an incident response report further comprising
         a template populated with data corresponding to a latest incremented version number for each of one or more predetermined attributes associated with the template, and
         response information derived from profile-specific attributes in association with the type of incident, and comprising one or more of priority areas within the defined area, incident contacts associated with the defined area, and priority elements relevant to the type of incident,
         wherein one or more of the profile-specific attributes are dynamically updated in real-time in response to the incident response request.

2. The system of claim 1, each respective version of the profile further uniquely comprising a specific incident responder or a hierarchy of incident responders associated with the defined area from among a plurality of incident responders, wherein the server is further configured to determine an optimal incident responder for the incident response request based at least in part on the type of incident associated with the incident response request, and to generate the user interface comprising the incident response report on a user computing device associated with the optimal incident responder.

3. The system of claim 2, wherein the optimal incident responder is selected for the incident response request based on a user-specified hierarchy.

4. The system of claim 2, wherein the optimal incident responder is selected for the incident response request based on criteria comprising geographical proximity, responder-specified call settings, and a user-specified hierarchy.

5. The system of claim 1, wherein the response information is further derived from attributes stored in a hosted database for related locations with respect to the defined area.

6. The system of claim 5, wherein the response information further comprises third party data derived from third party data sources associated with the defined area.

7. The system of claim 6, wherein the third party data sources comprise one or more data transmission units configured to dynamically transmit data packages to the server for entry as updated real-time attributes in response to the incident response request.

8. The system of claim 7, wherein the one or more data transmission units comprise one or more of sensors physically mounted in association with the defined area, global positioning systems and weather service databases.

9. The system of claim 7, wherein the server is further configured to determine, in accordance with a validation hierarchy associated with the profile, whether a data value is provided
   from one or more primary users, wherein the data value is automatically saved into the server memory, or
   from a secondary user, wherein the data value is submitted to one or more of the primary users for validation prior to entry into the server memory.

10. A system comprising:
    a plurality of user computing devices each comprising a memory in which is stored a respective version of an incident response profile associated with a defined area, the incident response profile comprising one or more version numbers corresponding to a set of data values for one or more attributes associated with each of one or more business objects specific to the defined area;
    a server comprising a memory in which is stored another respective version of the incident response profile associated with the defined area, the server configured to perform operations of:
       receiving from one of the plurality of user devices data records corresponding to the respective version of the incident response profile;
       determining whether one or more data values comprise valid updates with respect to attribute values stored in the server memory;
       synchronizing any determined valid updates with each other attribute value to generate a current incident response profile in the server memory, and generating one or more incremented version numbers corresponding to the current incident response profile;
       receiving from one of the plurality of authorized user devices an incident response request associated with the defined area; and
       generating a user interface comprising an incident response report, the report further comprising a template populated with data corresponding to a latest incremented version number for each of one or more predetermined attributes associated with the template.

11. The system of claim 10, wherein one of the profile-specific attributes comprises a list of one or more incident responders and associated contact information,
    the server further configured to perform the operation of generating the user interface comprising the incident response report on a user device associated with a first incident responder selected from the list of one or more incident responders associated with the defined area.

12. The system of claim 10, the first incident responder selected from the list based on criteria comprising geographical proximity, responder-specified call settings, and a user-specified hierarchy.

13. The system of claim 10, the incident response request comprising a type of incident, wherein the incident response report further comprising response information derived from profile-specific attributes in association with the type of incident.

14. The system of claim 13, the response information further derived from attributes stored in the server memory for related areas with respect to the defined area.

15. The system of claim 13, the response information further comprising third party data derived from third party data sources associated with the defined area, the third party data comprising one or more of priority areas within the defined area, incident contacts associated with the defined area, and priority elements relevant to the type of incident.

* * * * *